United States Patent
Weisman et al.

(10) Patent No.: US 9,264,266 B2
(45) Date of Patent: Feb. 16, 2016

(54) SUCCESSIVE INTERFERENCE CANCELLATION SYSTEM AND METHOD FOR MIMO HORIZONTAL ENCODING AND DECODING

(75) Inventors: Tzahi Weisman, Meiron (IL); Tom Harel, Shfaim (IL); Ayelet Doron, Modiin (IL)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 13/340,400

(22) Filed: Dec. 29, 2011

(65) Prior Publication Data

US 2013/0170534 A1   Jul. 4, 2013

(51) Int. Cl.
*H04B 7/02*   (2006.01)
*H04L 25/03*   (2006.01)

(52) U.S. Cl.
CPC .... *H04L 25/03318* (2013.01); *H04L 25/03961* (2013.01); *H04L 2025/03414* (2013.01); *H04L 2025/03426* (2013.01); *H04L 2025/03643* (2013.01)

(58) Field of Classification Search
CPC .................. H04L 25/03318; H04L 25/03961; H04L 1/0618; H04L 1/06
USPC ......................... 375/267, 229, 341
See application file for complete search history.

(56) References Cited

U.S. PATENT DOCUMENTS

| | | | | |
|---|---|---|---|---|
| 7,154,936 B2 * | 12/2006 | Bjerke et al. | | 375/148 |
| 7,526,705 B2 * | 4/2009 | Boer et al. | | 714/748 |
| 8,261,169 B2 * | 9/2012 | Kishigami et al. | | 714/794 |
| 8,457,265 B2 * | 6/2013 | Sampath | | 375/350 |
| 8,539,288 B1 * | 9/2013 | Sun et al. | | 714/704 |
| 8,694,851 B1 * | 4/2014 | Sun et al. | | 714/758 |
| 2008/0019434 A1 * | 1/2008 | Kim et al. | | 375/232 |
| 2011/0051858 A1 * | 3/2011 | Salvekar et al. | | 375/341 |

OTHER PUBLICATIONS

A. van Zelst (Per-Antenna-Coded Schemes for MIMO OFDM, Communications, 2003. ICC '03. IEEE International Conference on (vol. 4 ) , May 11-15, 2003, pp. 2832-2836 vol. 4.*

Lomnitz, Y et al (Efficient maximum likelihood detector for MIMO systems with small number of streams, Electronics Letters Oct. 25, 2007 vol. 43 No. 22).*

Letaief, K. B, et al., "Joint Maximum Likelihood Detection and Interference Cancellation for MIMO/OFDM Systems", IEEE 58th Vehicular Technology Conference, vol. 1, (Oct. 6, 2003), 612-616.

Yang, Lan, et al., "Combined Maximum Likelihood and Ordered Successive Interference Cancellation Grouped Detection Algorithm for Multistream MIMO", IEEE Eighth International Symposium on Spread Spectrum Techniques and Applications, (Aug. 30, 2004), 250-254.

* cited by examiner

*Primary Examiner* — Helene Tayong

(74) *Attorney, Agent, or Firm* — Schwegman Lundberg & Woessner, P.A.

(57) ABSTRACT

A method and system for receiving and decoding horizontally encoded MIMO-OFDM transmissions with improved efficiency. In one embodiment, MIMO decoding is performed on each of the extracted separate tones of a MIMO-OFDM signal to extract and demodulate frequency domain symbols of the first layer corresponding to one or more code blocks. For each code block of the first layer that passes an error check, corresponding portions of the second layer are decoded using SIMO decoding.

15 Claims, 3 Drawing Sheets

| Codeword_0 | CB_0 | | CB_1 | |
|---|---|---|---|---|
| Codeword_1 | CB_0 | CB_0 | | CB_0 |

US 9,264,266 B2

SUCCESSIVE INTERFERENCE CANCELLATION SYSTEM AND METHOD FOR MIMO HORIZONTAL ENCODING AND DECODING

BACKGROUND

MIMO (multi-input multi-output) communication uses multiple antennas at both the transmitter and receiver to exploit the spatial domain for spatial multiplexing and/or spatial diversity. In spatial multiplexing, MIMO is used to increase the capacity of a communications link by transmitting independent data streams in the same time slot and frequency band simultaneously from each transmit antenna, and differentiating multiple data streams at the receiver using channel information about each propagation path. A MIMO-OFDM system transmits independent OFDM (orthogonal frequency division multiplexing) modulated data from multiple antennas simultaneously. The digital data to be transmitted by a MIMO-OFDM transmitter is encoded into frequency domain symbols by a modulation scheme such as QAM (quadrature amplitude modulation) which symbols are then used to generate the OFDM symbols. The digital encoding may include added bits to be used for correcting or detecting errors in transmission (e.g., FEC or forward error correction). In what is referred to as per-antenna coding or horizontal encoding, each information symbol is transmitted over only one antenna.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figures 1, 2:
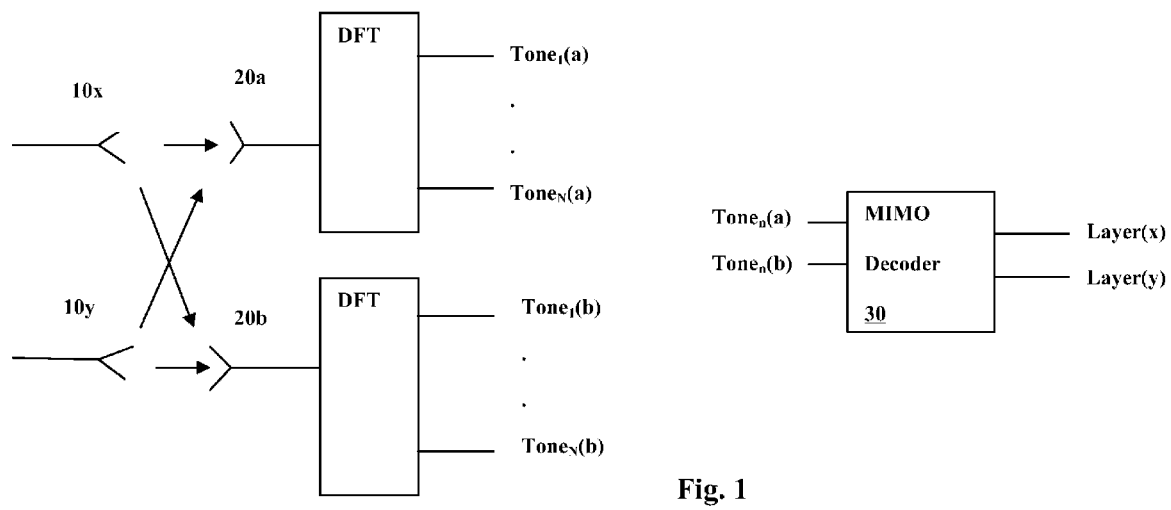
FIG. 1 shows the basic components of a 2×2 MIMO-OFDM system.
FIG. 2 illustrates code blocks within codewords in a horizontally encoded transmission.

Described herein is a method and system for receiving and decoding horizontally encoded MIMO-OFDM transmissions with improved efficiency. FIG. 1 illustrates an example 2×2 MIMO-OFDM system in which two transmit antennas 10x and 10y each transmit OFDM signals that are received by two receive antennas 20a and 20b.

In OFDM, data is encoded into symbols corresponding to the constellation points of a modulation scheme such as QAM (quadrature amplitude modulation), QPSK (quadriphase shift keying), or BPSK (binary phase shift keying) and transmitted on parallel modulated sub-carriers that are orthogonal to one another over the symbol period. The modulated sub-carriers are summed together to form a transmittable composite signal that can be demodulated at a receiver. An OFDM symbol to be transmitted is generated by encoding the input data into complex-valued symbols that correspond to the constellation points of a modulation scheme such as QAM. Because these complex-valued symbols are used to determine the amplitude and phase of a particular sub-carrier, they are referred to as frequency-domain symbols. The frequency-domain symbols are then input to an inverse discrete Fourier transform (IDFT or IFFT) and converted to a serial discrete-time signal that constitutes samples of a time domain waveform representing a sum of orthogonal sub-carrier waveforms with each sub-carrier waveform being modulated by a frequency-domain symbol. These samples (or the portion of an analog waveform containing the samples) may be referred to as an OFDM symbol or block. (OFDM symbols are sometimes referred to as meta-symbols, to be distinguished from the frequency domain symbols to which the input data is directly mapped.) The samples are then converted into an analog waveform by a digital-to-analog converter and mixed with an appropriate carrier to transmit the waveform over a communications channel. At the receiver, the waveform can then be re-sampled and discrete Fourier transformed (DFT or FFT) to recover the frequency-domain symbols, which symbols are then decoded to generate the transmitted data.

At the MIMO-OFDM receiver, OFDM demodulation of the received OFDM symbols generates the frequency domain symbols or tones transmitted from both of the transmit antennas superposed together in accordance with the channel transfer matrix. As shown in FIG. 1, a DFT of the received signal at antenna 20a generates tones $Tone_1(a)$ through $Tone_N(a)$, where N is the number of OFDM subcarriers or tones. Similarly, a DFT of the received signal at antenna 20b generates tones $Tone_1(b)$ through $Tone_N(b)$. MIMO decoding on each pair of tones from each antenna extracts the separate data transmitted by each transmit antenna. FIG. 1 shows tones $Tone_n(a)$ and $Tone_n(b)$ input to MIMO decoder 30 to generate the data transmitted by antennas 10x and 10y, designated as Layer(x) and Layer(y), respectively.

Consider a 2×2 OFDM MIMO signal transmitted using two codewords, each originating from an independent encoder (i.e., horizontal encoding). Each of the codewords thus represents the transmission from a single antenna, referred to as a layer. Each of the transmitted codewords is further divided into code blocks, each having an error detection code (e.g., CRC), possibly without alignment, as schematically illustrated in FIG. 2. A basic receiver MIMO demodulates each of the received tones by inverting the 2×2 channel matrix using zero-forcing (ZF) equalization, minimum mean square equalization (MMSE) or maximum likelihood detection (MLD). It then extracts the corresponding Log Likelihood Ratios (LLRs) for each of the underlying bits and feeds the decoder with the code blocks of codeword_0 while buffering codeword_1. After the processing codeword_0 is completed, the codeword_1 LLRs are fed to the decoder. Alternatively, two decoders in parallel (each operating with half of the throughput) may be used to save memory sizes at the expense of increasing hardware requirements.

An improved receiver uses a single decoder without the need to buffer the second codeword while maintaining the same basic throughput. This is achieved by demodulating (equalizing) only a single layer (codeword) from each of the received tones in half of the time (only half of the calculations are needed). The concept of demodulating only a single layer out of two received MIMO layers is referred to herein as MIMO-1. Demodulation using MIMO-1 may be performed using MLD or otherwise. Then the decoder is fed with the associated LLRs of the equalized layer. This is repeated for the second codeword exactly in the same manner. Although buffering the received tones is required in this scheme, this buffering is done in any case driven from other system requirements. Thus the pre-decoder buffering is saved, while the throughput is maintained. By applying two equalization iterations, each designated to extract a single layer out of the two MIMO layers, no buffering is needed prior to the channel decoder.

Figure 3:
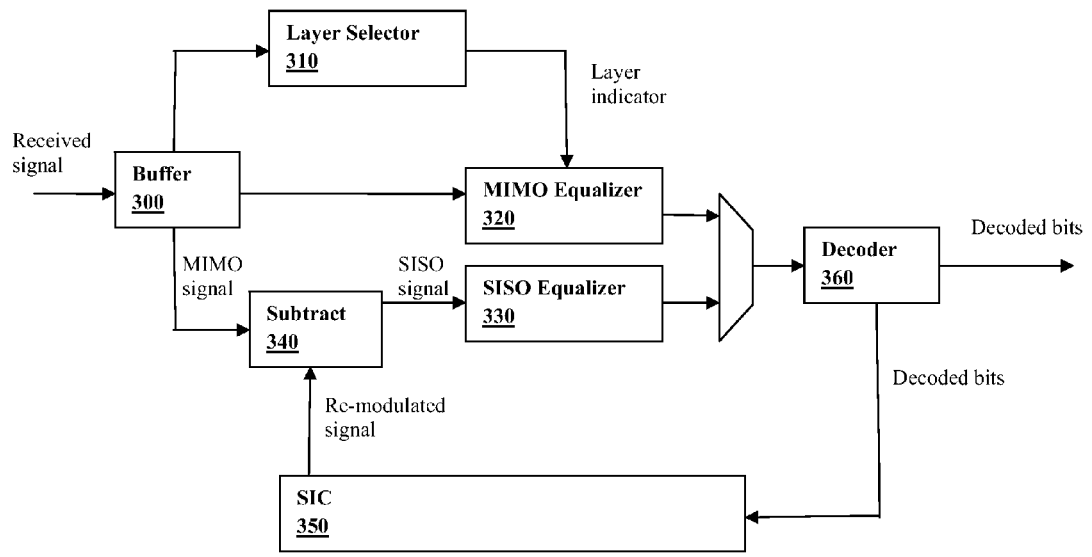
FIG. 3 depicts an SIC receiver.

Another type of receiver is one that utilizes successive interference cancellation (SIC) such as shown in FIG. 3. A buffer 300 receives the transmitted layers after performance of the DFT as described above to extract separate tones from the received OFDM symbol. A layer selector 310 uses a selected data dependent metric to decide which layer (codeword) is to be decoded out of the two MIMO layers using the MIMO-1 equalization mode described above (e.g., MLD applied to only one layer), and this information is input to MIMO equalizer 320. This codeword, if successfully decoded (e.g., as verified by a CRC check) by decoder 360, is re-modulated by SIC element 350, and subtracted from the received tones by element 340 such that the remaining codeword is treated as a single stream which is then SIMO (single-input multiple-output) demodulated by SIMO equalizer 330. Should the first codeword have failed, MIMO-1 equalization is applied to the second layer by MIMO equalizer 320.

Figure 4:
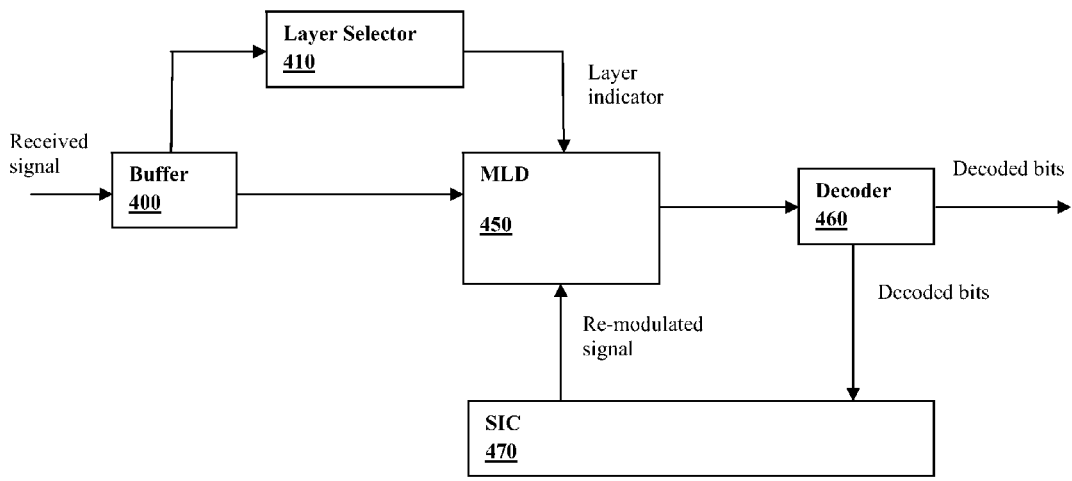
FIG. 4 depicts an SIC receiver with a single MIMO equalizer.

FIG. 4 depicts an SIC receiver that uses a single MIMO decoder or equalizer 450 that performs MLD in either a MIMO-1 mode or a SIMO mode. The equalizer is toggled between the MIMO-1 and SIMO modes according to whether or not a decoded layer passes error checking. First, a buffer 400 receives the transmitted layers after performance of the DFT as described above to extract separate tones from the received OFDM symbol. Layer selector 410 uses a selected data dependent metric to decide which layer (codeword) is to be decoded out of the two MIMO layers using the MIMO-1 equalization mode described above (e.g., MLD applied to only one layer) and passes this information to MIMO equalizer 450. The MIMO equalizer 450 decodes the first layer (MIMO-1 mode) and the decoded layer is output to decoder 460. Soft-decision decoding may be performed to output LLRs to the decoder. Decoder 460 performs an error check on the code blocks extracted from the first layer (e.g., a CRC check) to determines which tones are used at the feedback as the SIC tones. The equalization of the second layer (codeword) is then done intermittently in MIMO-1 mode and SIMO mode, depending if the associated tones belong to a failing or successful code block, respectively. Note that, in this embodiment, SIC can be applied per tone rather than per codeword, and a single MLD MIMO equalizer may be used both for MIMO tones and for SIMO (after application of SIC) tones.

Figure 5:
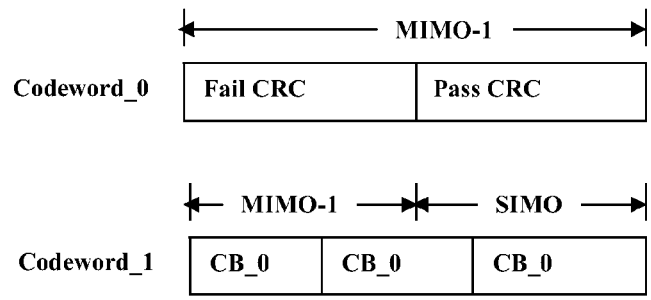
FIG. 5 illustrates code block selective SIC.

An example operation of the code block selective SIC scheme described above is illustrated in FIG. 5 using the same two codewords as shown in FIG. 2. In this example, codeword_0 is chosen to be processed initially using MIMO-1 mode resulting in a failure in CB_0 while CB_1 was successfully received. The processing of Codeword_1 is then done initially using MIMO-1 mode, aiming to decode the second layer out of two MIMO layers, followed by SIMO decoding due to the feedbacked QAM symbols belonging to CB_1 in Codeword_0. Note that the tones of CB_0 of Codeword_1 were selectively processed using both MIMO-1 and SIMO modes. Also note that the throughput of both MIMO-1 and SIMO is identical.

The immediate conversion of the MLD engine to perform SIMO decoding is achieved as follows: instead of scanning all constellation hypothesis combinations for the two MIMO layers (e.g. 4096 for 64 QAM), the constellation point of the feedbacked layer is being forced resulting in a single layer scanning only (e.g. 64 for 64 QAM). That is, for each code block of the first layer that passes the error check, the code block is remodulated into a constellation point and corresponding portions of the second layer are MIMO decoded using MLD by scanning only hypotheses for the second layer with the first layer forced to the remodulated code block (see, e.g., Y. Lomnitz, D. Andelman, *Efficient maximum likelihood detector for MIMO systems with small number of streams*, Electronics Letters, 25 Oct. 2007 Vol. 43 No. 22 for a description of single layer scanning using MLD). The SIMO throughput then is exactly as of the MIMO-1 equalization throughput, and additional MRC (maximal ratio combining) equalization is not needed.

An example system includes a transmitter for transmitting first and second layers of MIMO-encoded OFDM symbols and a receiver for receiving the first and second layers of MIMO-encoded OFDM symbols from the transmitter. Each OFDM symbol of the first and second layers may contain frequency domain symbols representing QAM-modulated data that is per-antenna encoded with a forward error correction code. The QAM-modulated data may be divided into code blocks that are each encoded with a forward error detection code, where the code blocks of the first and second layers may not necessarily be aligned. For example, a cyclic redundancy check (CRC) may be appended to each code block for error detection. The transmitter and receiver may each have two or more antennas for transmitting or receiving, respectively, the OFDM symbols. The example receiver includes circuitry configured to perform a DFT on the received MIMO-encoded OFDM symbols to extract separate tones from each such symbol, a MIMO equalizer for decoding the layer of an extracted tone using MLD to extract code blocks therefrom, and a decoder for extracting the transmitted data and for performing an error check on the code blocks extracted from the layer. The receiver may include a buffer for receiving the first and second layers of MIMO-encoded OFDM symbols and a layer indicator for inputting to the MIMO equalizer which layer is to be decoded. The MIMO decoding of the first and second layers by the MIMO equalizer may include soft-decision decoding to generate log-likelihood ratios (LLRs) for each layer.

The MIMO equalizer in the example receiver is configured to: 1) for each code block of the first layer that passes the error check, remodulate the code block into one or more frequency domain symbols and MIMO decode corresponding portions of the second layer using MLD by scanning only hypotheses for the second layer with the first layer forced to the remodulated code block, and 2) for each code block of the first layer that fails the error check, MIMO decode corresponding portions of the second layer using MLD. The MIMO decoding of the first and second layers may thus be performed by a single MLD decoder that either performs MLD by scanning hypotheses for both the first and second layers or by scanning hypotheses for only the second layer with the first layer forced to the remodulated code block. The MIMO decoding of the first layer may extract a predetermined number of frequency domain symbols of the first layer before MIMO decoding of the second layer is performed, and the predetermined number of frequency-domain symbols may correspond to a code word having one or more code blocks contained within. The MIMO decoding of the first and second layers may be performed for each tone of the OFDM symbol.

The embodiments as described above may be implemented in various hardware configurations that may include a processor for executing instructions that perform the techniques described. Such instructions may be contained in a suitable storage medium from which they are transferred to a memory or other processor-executable medium.

Figure 6:
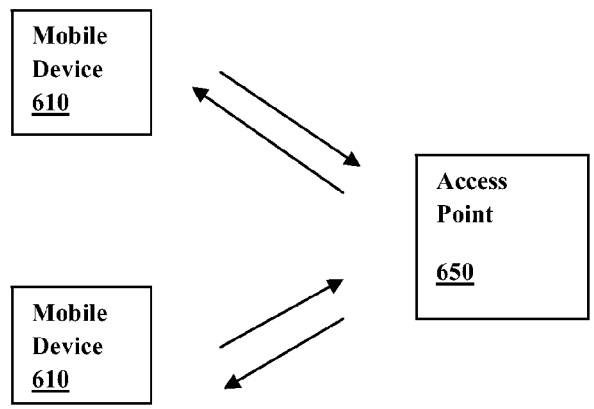
FIG. 6 illustrates a WLAN.
Figure 7:
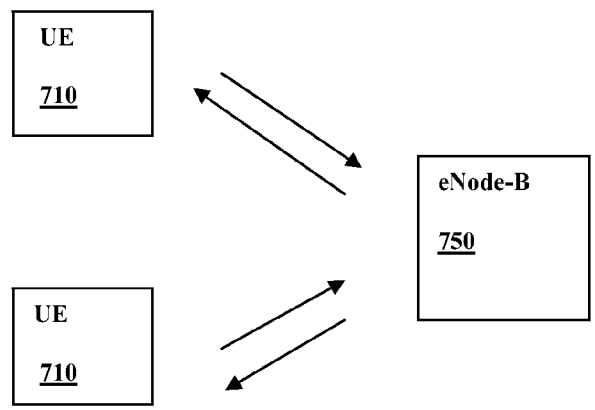
FIG. 7 illustrates parts of an LTE system.

The embodiments as described herein may be implemented in a number of environments. In some embodiments, the receiver may be part of a wireless local area network (WLAN) communication station such as a wireless access point (AP), base station or a mobile device including a Wireless Fidelity (WiFi) device. FIG. 6 shows an example WLAN with of number of mobile devices 610 communicating with an access point 650, where either or both types of devices may incorporate a receiver as described herein. In other embodiments, the receiver may be part of a 3rd Generation Partnership Project (3GPP) Universal Terrestrial Radio Access Network (UTRAN) Long-Term-Evolution (LTE) or a Long-Term-Evolution (LTE) communication system, although the scope of the invention is not limited in this respect. FIG. 7 shows an example LTE system where a number of mobile devices 710, defined by the LTE specification as User Equipment (UE), communicate with a base station 750, defined by the LTE specifications as eNode-B. Either or both of eNode-B and UE may incorporate a receiver as described herein.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for decoding first and second layers of MIMO-encoded (multi-input multi-output encoded) OFDM (orthogonal frequency division multiplexing) symbols, comprising:
  receiving the MIMO-encoded OFDM symbols made up of first and second layers, wherein each of the first and second layers contains tones belonging to code blocks that are per-antenna encoded with a forward error correction code;
  extracting separate tones from each received MIMO-encoded OFDM symbol;
  MIMO decoding only the first layer of the extracted tones using maximum likelihood detection to extract a predetermined number of frequency-domain symbols therefrom, where the predetermined number of frequency domain symbols corresponds to a code word having one or more code blocks contained therein;
  extracting code blocks from the MIMO-decoded first layer of the extracted tones and performing an error check thereon;
  for extracted tones that belong to the code block of the first layer that passes the error check, remodulating the code block into one or more frequency domain symbols and MIMO decoding the second layer of those extracted tones using maximum likelihood detection by scanning only hypotheses for the second layer with the first layer forced to the remodulated code block; and
  for extracted tones that belong to a code block of the first layer that fails the error check, MIMO decoding only the second layer of those extracted tones using maximum likelihood detection.

2. The method of claim 1 wherein each of the MIMO-encoded OFDM symbol of the first and second layers contains frequency domain symbols representing QAM-modulated (quadrature amplitude modulation) data that is per-antenna encoded with the forward error correction code.

3. The method of claim 2 wherein the QAM-modulated data is divided into code-blocks to which a cyclic redundancy check (CRC) is appended for error detection.

4. The method of claim 1 wherein the MIMO decoding of the first and second layers is performed for each tone of the MIMO-encoded OFDM symbol.

5. The method of claim 1 further comprising receiving the first and second layers of MIMO-encoded OFDM symbols at two receive antennas.

6. The method of claim 1 wherein the MIMO decoding of the first and second layers includes soft-decision decoding to generate log-likelihood ratios (LLRs) for each layer.

7. The method of claim 1 wherein the first and second layers contain code blocks that are not necessarily aligned.

8. A receiver, comprising:
two or more antennas for receiving first and second layers of MIMO-encoded (multi-input multi-output encoded) OFDM (orthogonal frequency division multiplexing) symbols;
circuitry to perform a DFT (discrete Fourier transform) on the received MIMO-encoded OFDM symbols to extract separate tones from each such symbol;
a MIMO equalizer for decoding layers of an extracted tone using maximum likelihood detection to extract frequency-domain symbols therefrom;
a decoder for extracting code blocks from the frequency-domain symbols of a MIMO-decoded layer and for performing an error check on extracted code blocks;
wherein the MIMO equalizer and decoder are to:
MIMO decode only the first layer of the extracted tones using maximum likelihood detection to extract a predetermined number of frequency-domain symbols therefrom, where the predetermined number of frequency domain symbols corresponds to a code word having one or more code blocks contained therein,
perform an error check on the code blocks extracted from the first layer;
for extracted tones that belong to a code block of the first layer that passes the error check, remodulate the code block into one or more frequency domain symbols and MIMO decode the second layer of those extracted tones using maximum likelihood detection by scanning only hypotheses for the second layer with the first layer forced to the remodulated code block; and
for extracted tones that belong to the code block of the first layer that fails the error check, MIMO decode only the second layer using maximum likelihood detection.

9. The receiver of claim 8 wherein each of the MIMO-encoded OFDM symbol of the first and second layers contains frequency domain symbols representing QAM-modulated (quadrature amplitude modulation) data that is per-antenna encoded with the forward error correction code.

10. The receiver of claim 9 wherein the QAM-modulated data is divided into code-blocks to which a cyclic redundancy check (CRC) is appended for error detection.

11. The receiver of claim 8 wherein the MIMO decoding of the first and second layers is performed for each tone of the MIMO-encoded OFDM symbol.

12. The receiver of claim 8 further comprising a buffer for receiving the first and second layers of the MIMO-encoded OFDM symbols and a layer indicator for inputting to the MIMO equalizer which layer is to be decoded.

13. The receiver of claim 8 wherein the MIMO decoding of the first and second layers includes soft-decision decoding to generate log-likelihood ratios (LLRs) for each layer.

14. The receiver of claim 8 wherein the first and second layers contain code blocks that are not necessarily aligned.

15. A non-transitory storage medium containing processor-executable instructions for decoding first and second layers of MIMO-encoded (multi-input multi-output) (encoded) OFDM (orthogonal frequency division multiplexing) symbols by:
receiving the MIMO-encoded OFDM symbols made up of first and second layers, wherein each of the first and second layers contains tones belonging to code blocks that are per-antenna encoded with a forward error correction code;
extracting separate tones from each received MIMO-encoded OFDM symbol;
MIMO decoding only the first layer of the extracted tones using maximum likelihood detection to extract a predetermined number of frequency-domain symbols therefrom, where the predetermined number of frequency domain symbols corresponds to a code word having one or more code blocks contained therein;
extracting code blocks from the MIMO-decoded first layer of the extracted tones and performing an error check thereon;
for extracted tones that belong to the code block of the first layer that passes the error check, remodulating the code block into one or more frequency domain symbols and MIMO decoding the second layer of those extracted tones using maximum likelihood detection by scanning only hypotheses for the second layer with the first layer forced to the remodulated code block; and
for extracted tones that belong to a code block of the first layer that fails the error check, MIMO decoding only the second layer of those extracted tones using maximum likelihood detection.

* * * * *